Oct. 15, 1963   W. J. O. WESSELS   3,107,071
VERTICAL TAKE-OFF AND LANDING AIRCRAFT
Filed Dec. 28, 1961
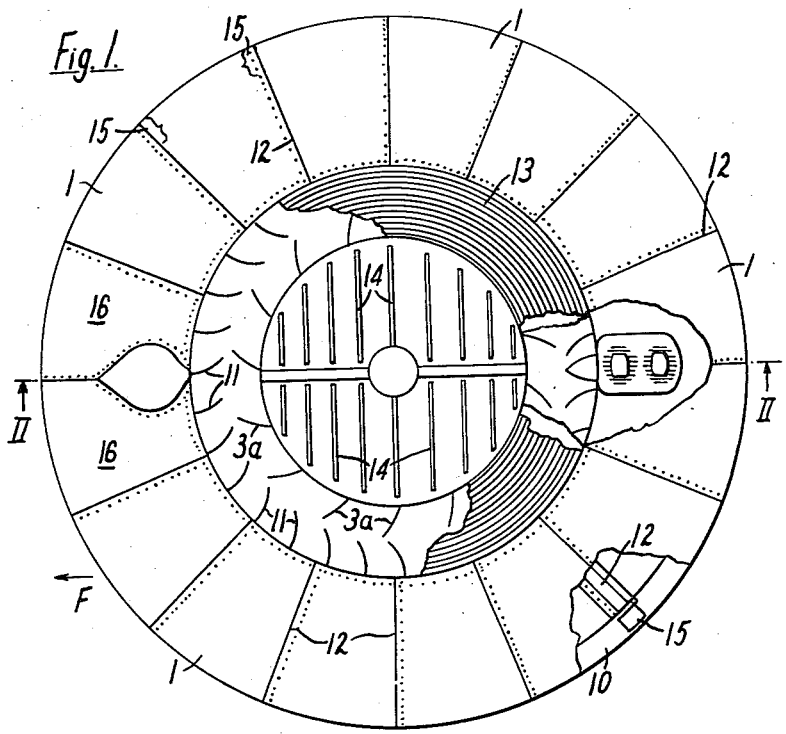
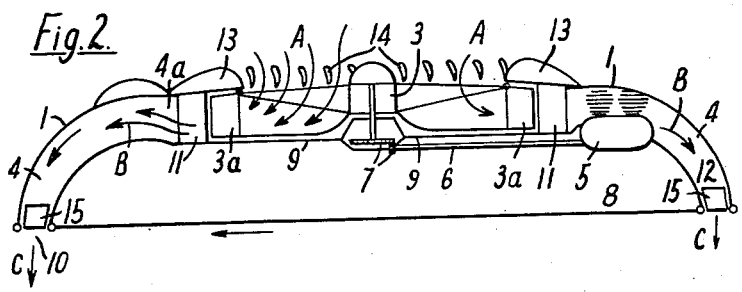
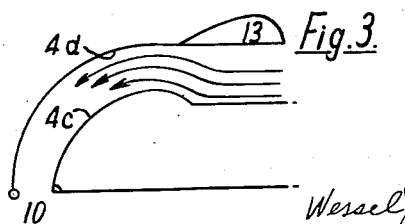
Inventor
Wessel Johannes Olivier Wessels
By Wenderoth,
Lind & Ponack   Attorney 3,107,071
VERTICAL TAKE-OFF AND LANDING AIRCRAFT
Wessel J. O. Wessels, Private Bag 23,
Gatooma, Southern Rhodesia
Filed Dec. 28, 1961, Ser. No. 162,799
Claims priority, application Rhodesia and Nyasaland
Jan. 5, 1961
7 Claims. (Cl. 244—23)

This invention relates to aircraft of the so-called vertical take-off and landing type comprising a fuselage or body, winged or otherwise and suitably designed for efficient normal more or less level flight under suitable propulsion and comprising a means for the generally downward direction of air from its underside for causing and controlling its ascent from and descent to the ground.

According to one feature of this invention, the aircraft body may consist of, comprise or include one or more structures of domed, generally flat-bottomed external configuration, having in the central upper region and on the axis of symmetry of said configuration a radial-flow air fan, the intake to which is axially through an opening above it coaxial with said configuration and the airflow from which takes place centrifugally into an annular duct which is centered on said axis and curves generally outwards and downwards to terminate as an annular discharge opening at or not greatly removed from the bottom of the structure.

More particularly the annular duct conforms as to its outer-upper and inner-lower surfaces to a figure of revolution generated round the aforesaid axis by a pair of smoothly curved lines which converge generally towards one another from the vicinity of the fan to their extremities which describe the aforesaid annular discharge opening.

The curvatures of the said lines generating the upper (concave) and lower (convex) opposing surfaces of the annular duct as aforesaid are preferably such as to present, to the radial airflow from the fan into the duct and over said surfaces to the discharge opening, such streamlined aerofoil characteristics as give rise to lifting forces over said surfaces, as the direction of airflow changes substantially through a right angle between the fan and the duct discharge opening.

The foregoing and other features of this invention are embodied in the example now to be described with reference to the accompanying semidiagrammatic drawings.

In these drawings:

FIGURE 1 is a plan, partly shown in section, of a vertical take-off and landing aircraft constructed and operable as described;

FIGURE 2 is a sectional elevation, of the same aircraft, in the diametric plane indicated by line and arrows II—II in FIGURE 1; and FIGURE 3 is a fragmentary view representative of a vertical section of the air duct in any diametric plane containing the fan axis.

Referring to these drawings reference 1 denotes the domed upper surface of the aircraft and reference 2 its flat bottom surface, between which are contained the centrally mounted radial flow fan 3, the annular air duct 4, the fan motor 5 and its drive 6 to the fan through a bevel or like gear at 7. The space 8 below the fan 3, and isolated from it and the duct 4 by the horizontal partition 9 remains as load-carrying space, bounded by the annular duct discharge at 10.

The flow of air into, through and from the duct 4 is indicated by the arrows A, B and C in FIGURE 2.

Referring more particularly to FIGURES 2 and 3, the air drawn through the fan inlet opening in the upper surface 1, is discharged radially from the fan vanes $3a$ through fixed guide vanes 11 round the annular mouth $4a$ of the duct, into the latter and out through the duct discharge 10. In turning through substantially a right angle, the current of air exerts an upward lifting force on the whole structure. Thus, the convex, lowermost duct surface $4c$ is preferably shaped to present a frontal part to the airflow from the fan, as well as a continuation from said frontal part towards the annular discharge opening 10, conforming substantially to the leading edge and upper surface portions of an aircraft aerofoil wing; that is, the curvature at the inlet to the duct is described by a smaller radius than at the discharge point of the duct with graduation of the curvature between these two regions. Likewise, the concave uppermost duct surface $4c$ preferably conforms in shape at least as to its frontal region to the underside of an aerofoil wing surface; whereby to create inside the duct by pressure reduction over the surface $4c$ substantial lifting forces.

The guide vanes 11 interposed in annular disposition about the periphery of the fan impeller are so devised as to ensure true radial flow of the air therefrom into the upper and inner end of the annular duct.

Circumferentially distributed ribs as at 12 in FIGURES 1 and 2 separating the duct surfaces may serve also to maintain the air flow inside the duct in planes containing the axis of the structure.

Another feature of the invention as illustrated is the provision, coaxially above the guide vanes and conveniently serving incidentally to support them, of an annular fairing formation 13 of convex flared internal profile, which provides a stream-lined air intake throat to the fan impeller.

Yet another feature of the illustrated example consists in mounting above the fan impeller and across the said air intake an adjustable louvre, the slats 14 of which are arranged parallel to one another on individual axes, supported also by the fairing 13, across the intended direction of forward flight, indicated by arrows F in FIGURES 1 and 2, and separately or collectively moveable about such axes between a closed position when they cooperate to obturate the air intake completely and so render the fan impeller ineffective and partially or wholly opened positions for generally controlling the effective operation of the fan in delivering air into the duct aforesaid, whether circumferentially uniformly or differentially into different circumferential regions of the duct. Instead of obtaining control as aforesaid by the air intake louvre system, such control may be obtained, and the like effects secured, by making the aforementioned annularly disposed guide vanes round the fan impeller individually or selectively or collectively moveable.

In the operation of an aircraft embodying the invention as set forth above, for vertical take-off, with the fan set in operation and the air flow controlled by the louvre and/or guide vanes for blowing uniformly in all directions into the duct (when the air is also discharged evenly from the annular discharge opening) the required lift is produced and its force is regulable by regulating fan speed and/or general adjustment of the louvre or the like. With the aircraft elevated to desired altitude and during vertical and forward flight, balance or trim or lateral stability thereof is under the differentially controllable movement of the louvre slats and/or guide vanes determining the moment, about the structure axis, of the resultant of the lift forces caused, as above, by the air stream traversing, as well as by its leaving, the annular duct from the fan in the generally downward direction. Air vanes may be distributed as at 15 in the outlet region 10 of the annular duct and made regulable for controlling the structure in the yawing plane, to provide resistance to torque, and/or for creating or assisting forward flight of the structure.

Adverting to other features which may be included in construction of an aircraft according to this invention, the interior space 8 defined to the inside of the inner of the duct-forming members, may in some cases conveniently house the motor controls for normal flying and all such controls as need to be accessible to the pilot for whom a nacelle may be provided as at N and any necessary further visibility can be obtained from said interior space by panels of transparent material suitably positioned or distributed as at 16 in the duct-forming members. The motor or motors is/are housed in the annular duct for direct air cooling by the air stream therein, as shown in the drawings above described. The aforementioned space can also or alternatively provide passenger and/or other load-accommodating space. Whereas the domed exterior surface 1 of the structure may be caused to have sufficient aerofoil characteristics for the support of the aircraft in the air in normal forward flight, its lifting surface may be augmented as required by the provision of wings, tail planes and/or other ancillary aerofoil surfaces.

The aforesaid structure, or more than one thereof, operable as explained above, may not itself/themselves constitute the entire or any major part of the aircraft body but can be included, e.g. set suitably into, an aircraft of more or less presently conventional design in efficient manner to provide or contribute to its propensities for vertical take-off, and landing.

I claim:

1. A vertical take-off and landing type aircraft comprising at least one structure of domed generally flat-bottomed external configuration having in the central upper region and on the axis of symmetry of said configuration a radial-flow air fan, said structure having an opening coaxial with said configuration forming an intake for said fan axially through said opening above said fan, an annular duct in said structure for the air flow centrifugally from said fan, said duct having a lower convex and an upper concave surface, said duct being centered on said axis and curves smoothly and convergently outwardly and downwardly through substantially a right angle to terminate as an annular discharge opening in the neighborhood of the bottom of said structure and said lower duct surface having a raised frontal edge presented to the outflow from said fan and a steadily decreasing curvature from such edge to said discharge opening.

2. An aircraft as claimed in claim 1 including fixed guide vanes arranged around said fan between said fan and said duct.

3. An aircraft as claimed in claim 2 wherein said fixed guide vanes impart true radial flow of the air therefrom into said duct.

4. An aircraft as claimed in claim 2 including an annular fairing conformation of convex flared internal profile, coaxially above said guide vanes and defining said intake opening to said fan.

5. An aircraft as claimed in claim 2 wherein said guide vanes are movable.

6. An aircraft as claimed in claim 1 including circumferentially distributed ribs separating said duct surfaces, said ribs extending in planes containing the axis of said structure.

7. An aircraft as claimed in claim 1, including across said air intake opening an adjustable louvre comprising slats arranged parallel to one another on individual axes transverse of the intended direction of forward flight of the aircraft and movable about such axes between a closed position to obturate said intake opening completely and opened positions.

References Cited in the file of this patent

UNITED STATES PATENTS

| | | |
|---|---|---|
| 2,944,762 | Lane | July 12, 1960 |
| 2,945,642 | Nofi | July 19, 1960 |
| 2,996,266 | Rebasti | Aug. 15, 1961 |
| 3,042,129 | Wade | July 3, 1962 |
| 3,073,551 | Bowersox | Jan. 15, 1963 |

FOREIGN PATENTS

| | | |
|---|---|---|
| 15,735 | Great Britain | of 1912 |